US010564868B2

(12) United States Patent
Afriat et al.

(10) Patent No.: US 10,564,868 B2
(45) Date of Patent: *Feb. 18, 2020

(54) METHOD AND APPARATUS FOR SELECTING POWER STATES IN STORAGE DEVICES

(71) Applicant: Western Digital Technologies, Inc., San Jose, CA (US)

(72) Inventors: Itshak Afriat, Tel-Mons (IL); Judah Gamliel Hahn, Ofra (IL); Karin Inbar, Ramat Hasharon (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/878,735

(22) Filed: Jan. 24, 2018

(65) Prior Publication Data

US 2019/0227725 A1    Jul. 25, 2019

(51) Int. Cl.
*G06F 1/00* (2006.01)
*G06F 3/06* (2006.01)
*G06F 1/32* (2019.01)

(52) U.S. Cl.
CPC ............ *G06F 3/0625* (2013.01); *G06F 1/32* (2013.01); *G06F 3/0634* (2013.01); *G06F 3/0653* (2013.01); *G06F 3/0679* (2013.01); *G06F 3/0683* (2013.01)

(58) Field of Classification Search
CPC ..................................................... G06F 3/0625
See application file for complete search history.

(56) References Cited

U.S. PATENT DOCUMENTS

| 9,260,066 | B2* | 2/2016 | Tokunaga | B60R 16/03 |
| 9,916,876 | B2* | 3/2018 | Partiwala | G11C 5/148 |
| 2010/0023800 | A1 | 1/2010 | Hared et al. | |
| 2011/0296088 | A1 | 12/2011 | Duzly et al. | |
| 2012/0023351 | A1 | 1/2012 | Wakrat et al. | |
| 2012/0124276 | A1 | 5/2012 | Ahn et al. | |
| 2015/0309750 | A1 | 10/2015 | Chen et al. | |
| 2015/0309752 | A1 | 10/2015 | Ellis et al. | |
| 2016/0041831 | A1* | 2/2016 | Carmeli | G06F 9/4418 710/106 |
| 2017/0060202 | A1* | 3/2017 | Sundaram | G06F 1/206 |

OTHER PUBLICATIONS

International Search Report issued in corresponding International Application No. PCT/US2018/060752, dated Feb. 27, 2019 (6 pages).
Written Opinion issued in corresponding International Application No. PCT/US2018/060752, dated Feb. 27, 2019 (8 pages).
U.S. Appl. No. 15/913,581, filed Mar. 6, 2018.

* cited by examiner

*Primary Examiner* — Mohammed H Rehman
(74) *Attorney, Agent, or Firm* — Patterson & Sheridan, LLP; Steven H. Versteeg

(57) ABSTRACT

A method and apparatus for selecting power states in storage devices for computers including providing monitoring storage device parameters and comparing those parameters to endurance thresholds to increase reliability of the storage device.

22 Claims, 3 Drawing Sheets

METHOD AND APPARATUS FOR SELECTING POWER STATES IN STORAGE DEVICES

FIELD OF THE DISCLOSURE

Aspects of the disclosure relate to power states and power usage of host connected devices. More specifically, aspects of the disclosure relate to methods for selective advertisement of power states in storage devices.

BACKGROUND INFORMATION

Field

Consumer storage devices, such as memory arrangements for computers, may have a number of power states. These power states are individually defined and are created to reduce overall power usage. In certain instances, there may be a trade-off between different power parameters and the time and energy required to enter and exit these power states. A device may advertise multiple power usage states with different operational parameters.

In one example, the NVM Express protocol used by a high-performance consumer storage device includes up to thirty two power states, each of which is advertised by the device as part of the response to a host-submitted Identify Controller command. Each of the individual power states include parameters such as the entry latency, exit latency, and target power consumption while the state is active. Entry latency, for example, is measured as the time taken from the completion of the command which puts the device into a specific power state until power consumption does not exceed the target. Exit latency is measured as the time from when the device leaves the power state (either due to a host power management directive or due to an I/O command) until the device is operational again and can complete an input/output command successfully without additional latency.

Non-volatile memory consumer devices typically have two non-operational power states, as well as three operational states. The non-operational states are referred to herein as PS3 and PS4, although an implementation may have different power states and may number these states in a different manner.

PS3 is defined as a non-operational state with a short entry and exit latency, while the PS4 state sacrifices latency for greater power reduction. For example, the PS3 state may have an entry and exit latency measured in the single-microsecond range, while consuming 50-100 mW of power, while the PS4 state may have an entry and exit latency measured in the hundreds of microseconds but may consume only 1-5 mW of power. In both cases, the device will consume much more power during the transition period, as the device records state information.

Non-volatile memory storage devices may support multiple power management command methods. For example, in devices using the NVM Express protocol, the host may send a "Set Features/Power Management" command to the device with the requested power state in order to initiate transition to a new state. After the command completes successfully, the device transitions to the new power state within the time advertised in the entry latency parameter of the power state table returned in the "Identify Controller" data structure. In a host directed device initiated method (Autonomous Power State Transitions), the host sends a list of power states that the device should transition into, based on idle time. When the device detects that no commands have been sent from the host for the specified duration, it will transition into a given non-operational power state autonomously. In both cases, the device will transition back to the last operational power state immediately upon receipt of an input/output command. The host may take the entry and/or exit latency into account in selecting eligible power states as well as in specifying the idle time required prior to transitioning into this power state.

Each transition has a certain cost in terms of power (transitional energy). Writing state data to the device may also impact endurance, since each transition may require control writes and padding for open blocks. In a worst-case environment, immediate power state transitions following very small writes may drastically increase write amplification.

There is a need to provide a method for minimizing the power state transition costs for devices that may be connected to a host.

There is a further need to provide a method and apparatus to allow the most efficient use of power states for a connected device.

There is a still further need to provide a method and apparatus to detect commands from a host device and allow a connected device sufficient autonomy to minimize not only power costs but also latency and operational command requests.

SUMMARY

So that the manner in which the above recited features of the present disclosure can be understood in detail, a more particular description of the disclosure, briefly summarized below, may be had by reference to embodiments, some of which are illustrated in the appended drawings. It is to be noted that the appended drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a device for storing data is disclosed comprising a storage arrangement configured to store and retrieve data, at least one endurance counter configured to monitor operations of the storage arrangement and compare operations to a threshold, a host interface configured to send and receive data from and to a host, a flash translation layer, a storage interface configured to send and receive data to the storage arrangement, a power state modifier configuration connected to the identify controller and a power manager configured to supply power to the storage arrangement, the host interface, the flash translation layer, the identify controller and the storage interface, wherein the identify controller is configured to have a table of power states for the storage arrangement, the host interface, the flash translation layer, the storage interface and the power state modifier is configured to update the table of power states dynamically and wherein the power manager is configured to read the table of power states and deliver power to the storage arrangement, the host interface, the flash translation layer, the identify controller and the storage interface according to the table.

In another non-limiting embodiment, a method of operation for a storage device is disclosed comprising: entering a maintenance cycle with the storage device; retrieving endurance data for at least one parameter of the storage device;

comparing the endurance data for the at least one parameter of the storage device to a rated value, determining when the endurance data for the at least one parameter of the storage device exceeds the rated value and modify a lowest power state of the storage device.

In another non-limiting embodiment, an arrangement is disclosed comprising means for entering a maintenance cycle with the storage device, means for retrieving endurance data for at least one parameter of the storage device, means for comparing the endurance data for the at least one parameter of the storage device to a rated value, means for determining when the endurance data for the at least one parameter of the storage device exceeds the rated value and means for modify a lowest power state of the storage device.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
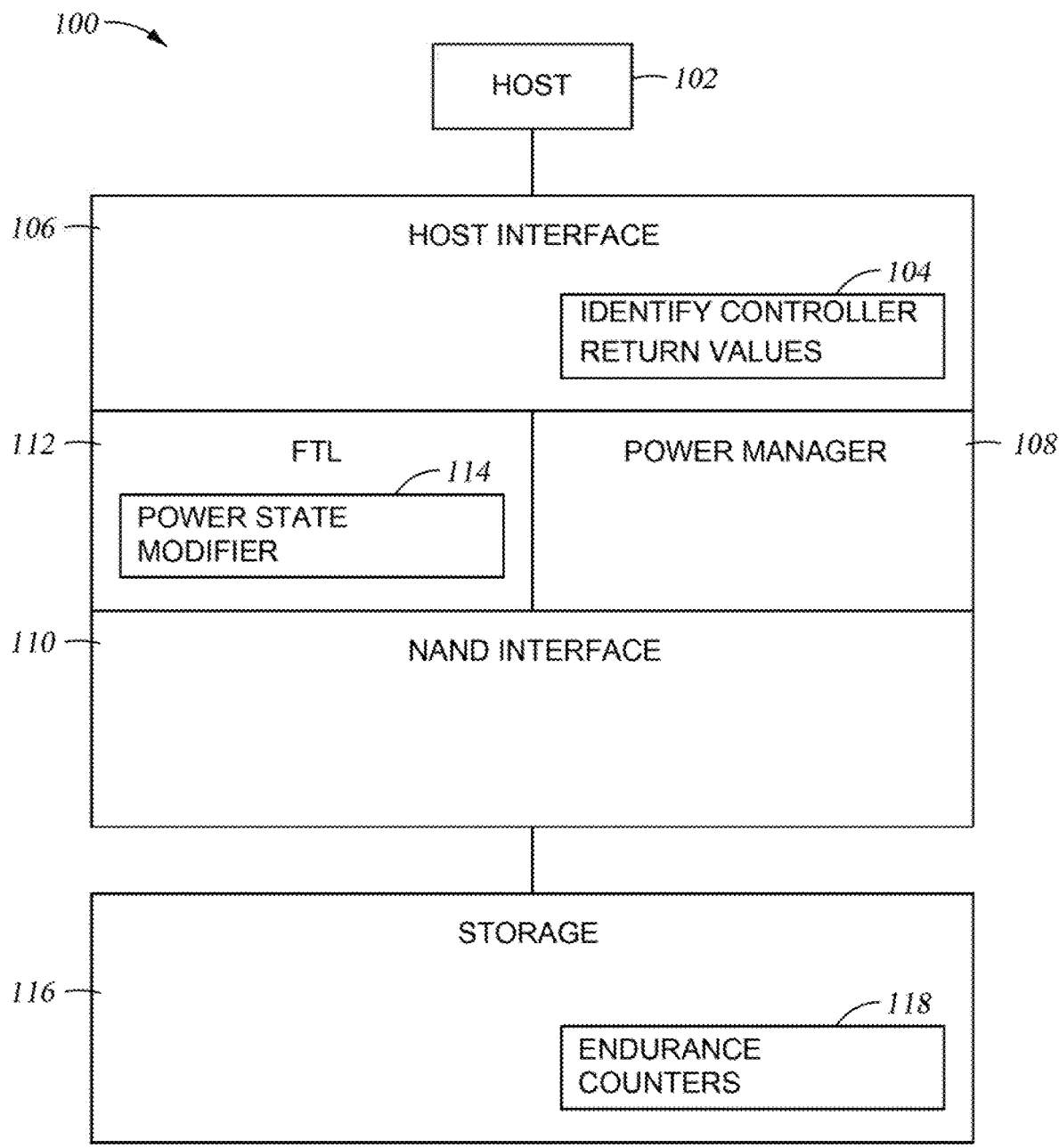
FIG. 1 is a diagram of a host and host-connected device, in one example embodiment of the description.

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim. Likewise, reference to "the disclosure" shall not be construed as a generalization of an inventive subject matter disclosed herein and shall not be considered to be an element or limitation of the appended claims except where explicitly recited in a claim.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

The aspects of the description apply to computers and more specifically, aspects of controlling computers or computer connected devices such that the devices perform in an optimal method of operation. The aspects described relate to a host that interacts with other devices, such as a data storage arrangement. Data storage arrangements may be, for example, disk drives, hybrid disk drive, NAND flash units and other similar arrangements. In the illustrated embodiments described, NAND flash units are described.

In the embodiments described, a data storage arrangement is connected to a host system through an interface. The host system, in the illustrated embodiments, is a personal computer or a server so the personal computer or server may transmit and receive data from a data storage arrangement. The function of the data storage arrangement is to accept and store data until the data is needed by a user or the host. The data storage arrangement may have to accept large bursts of data at a rapid pace, depending on the computer processes performed, therefore the data storage arrangement is configured with multiple memory units, formed into arrays, that provide for various states of usage. Dies may write data to the arrays, as necessary, to complete the memory storage functions.

Certain sections of the data storage arrangement may be configured of memory systems that provide for fast action (low latency) so that computer processes may be conducted at a rapid pace. Such low latency action may be accomplished by single layer cell memory configurations. If bulk amounts of data are required to be stored, multiple layer cell memory configurations are also present, such as triple level cell memory configurations. A NAND data storage arrangement with specific arrays may be configured from single level or multi-level cell arrangements. The data storage arrangement may have an interface that allows the data storage arrangement to connect with the host and allow for synchronization of the host and the data storage arrangement. The interface may be a NVM Express (NVMe) compatible interface, as a non-limiting embodiment. The memory storage may have a configuration to allow for plug and play ability. Although described as having a NVMe compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection.

Auxiliary connections may be provided to the data storage arrangement to allow for additional options for inputting data directly to the data storage arrangement without interfacing with a host. Such direct input of data may be provided through placement of an integrated secure digital card to offload or copy data. Other auxiliary connections may be provided for additional input/output operations. Such connections may be USB 2.0, USB 3.0, Firewire or other hard-wired configurations. Gigabit Ethernet interfaces and connections may also be used. The throttling capabilities of the memory arrangement, therefore, may be used in capacities where writing of data to a NAND arrangement, secure digital card or other memory arrangement is necessary.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, and stereo audio systems. The internal software may also be provided such that the access of data may be performed by cloud applications designed for interface with the data storage arrangement.

The internal software of the data storage arrangement may be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

A controller is provided to control actions of the data storage arrangement as required by the host. The controller may also be configured to perform maintenance activities for the data storage arrangement to allow for efficient use. The controller may be provided with code that interfaces with the internal software of the data storage arrangement to allow the controller to perform the various functions required. The controller, for example, may interact with the dies of the data storage device to allow for reading or writing of data to the data storage device.

Referring to FIG. 1, an arrangement 100 is illustrated. A host 102 is connected through a host interface 106 to a storage arrangement 116. The storage 116 arrangement may be, for example, a solid state drive that is configured to send and receive data. The storage arrangement 116 may be comprised of NAND flash units which may be of single level cell construction for minimum latency characteristics. In other embodiments, the NAND flash units may be multi-level cell constructions if reduced cost for the storage 116 is required or if a greater amount of storage 116 is needed.

The data that is sent to the storage 116 from the host 102 passes to a host interface 106 that has an controller that may identify return values 104. The host interface 106 allows for communication between components downstream of the interface with the host 102. In one embodiment, elements 106 to 110 may be grouped together as a storage controller. A power manager 108 is also connected to the host interface 106 and a NAND interface 110 as well as a flash translation layer (FTL) 112. The FTL 112 is used to translate the logical block addresses into physical locations in storage. File system translation occurs in the host 102. The FTL 112 may be programmed, therefore, to account for expected lifecycles of the NAND, energy consumption and performance of the NAND in the storage 116.

A power state modifier 114 is also present to modify power states of the storage 116 and/or other components through action of the power manager 108. The power state modifier 114 can modify the power delivered to the different systems through updating of the power state tables in the identify controller return values 104. In one non-limiting embodiment, five (5) different power states can be chosen. Although described as having five (5) different power states, other numbers of power states may be used.

In other non-limiting embodiments, endurance counters 118 may be provided such that a number of cycles of certain actions of the storage device are monitored and counted. The actions, such as a number of read operations, a number of write operations, may be counted and are further described below. For the purposes of definition, the storage 116, endurance counters 118, NAND interface 110, power manager 108, FTL 112, power state modifier 114, host interface 106 and identify controller return values 104 may be one arrangement, or "device" that may be housed in a single unit. Other arrangements of the device may include less or more components described.

Endurance counters 118 are an example of an apparatus used to manage device endurance. In one non-limiting embodiment, the counters 118 may track program/erase frequencies for NAND storage 116. The storage 116 may also use statistical methods or bit error rate (BER) tracking in place of or in addition to the endurance counters. In specific cases, a device 116 may track media wear-out either for specific blocks or for the entire device 116. When media wear-out exceeds a pre-defined threshold, the device 116 will notify the host 102 that the device 116 has exceeded a useful life and should be replaced to prevent data loss. The storage 116 may also track power on hours and host write data, and is rated to last a certain number of years of use and/or a certain amount of host write data. In instances where the number of hours/years of operation exceed manufacturer limits, a warning may be generated to a user or system manager.

Aspects described also provide for a dynamically updated power state table. In conventional applications, a power state table is generally treated as a static set of entries. Significant advantages, however, are present when a power state table is dynamically updated. In certain circumstances, the device may change advertised power states at any time, although the host 102 will typically only consult the power state table during device initialization and may not note the new states until the next reset. The device may alter parameters in order to manipulate host decisions on which power state to use.

Figure 2:
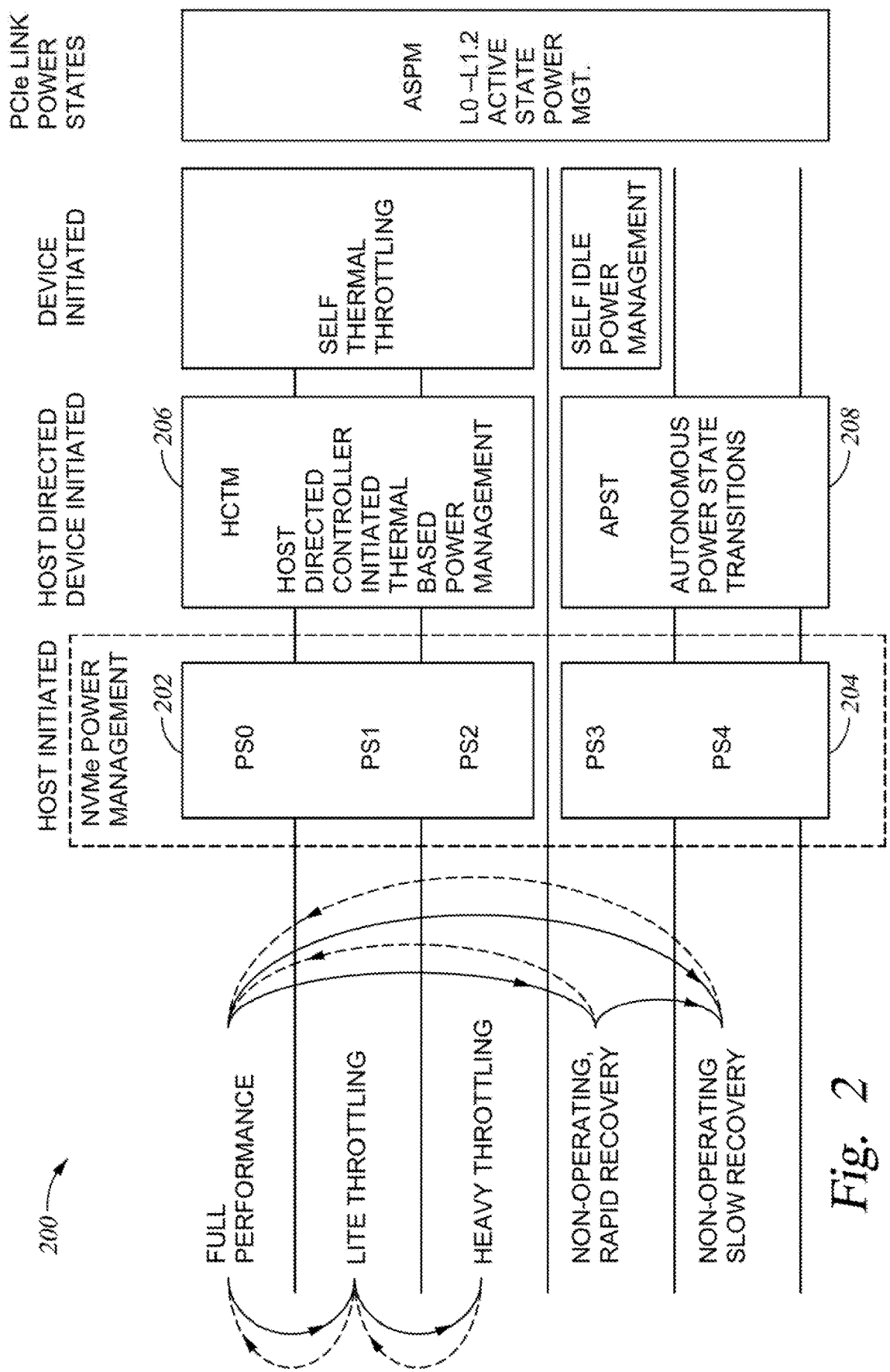
FIG. 2 is a graph of power states of a host-connected device in another example embodiment of the description.

As recited above, five (5) power states may be used, as a non-limiting embodiment. Referring to FIG. 2, different power states 200 may be used according to different host initiated schemes, host directed device initiated schemes, device initiated or PCIe link power states. In a non-limiting embodiment for a host initiated method, five different power states PS0, PS1, PS2, PS3 and PS4 are illustrated. Power states PS3 and PS4 204 relate to non-operating rapid recovery (PS3) and non-operating slow recover (PS4). Power state PS2 relates to heavy throttling, PS1 relates to lite throttling and PS0 relates to full performance. The lowest power rating of the described power states is PS4. In the illustrated embodiment, power may be reduced from a full performance PS0 to PS4 value (non-operating slow recovery) or PS3 (non-operating rapid recovery). Power stage changes can also occur between PS0 (full performance) to PS1 (lite throttling) in both increasing and decreasing power states. Power may also be increased or decreased between PS1 (lite throttling) and PS2 (heavy throttling) power states.

Still referring to FIG. 2, for host directed and device initiated schemes ($2^{nd}$ from left), the host 102 may have a controller that directs operations based upon thermal based power management 206. To aid in the thermal based power management, thermocouples or other temperature sensors may be strategically located throughout the device for actual temperature measurement or a data table may be used for anticipated thermal values based upon operations. Factors such as ambient temperature, humidity, length of operation may also be accounted for within these values. For low power states for host directed and device initiated schemes, autonomous power state transitions (APST) 208 may be used to for control.

In one example embodiment, a host driver may have a maximum entry/exit latency threshold, above which a specific power state will not be selected. As such, the device may raise this threshold if frequent power state transitions have accelerated device wear-out, thus extending the device life at the cost of additional power consumption. In another non-limiting embodiment, the device may change the target power consumption advertised for a specific power state, thus raising the allowed power budget and reducing the need to perform additional control writes in that state. In other embodiments, drivers may utilize host directed or device initiated power state transition methods, as necessary. One power state may be selected based on entry and exit latency, in the case of a host directed power management action. The idle time prior to transition is determined by the host 102 and may not factor in device-side latencies.

In device initiated power management actions, two power states may be selected. Idle time prior to transition may be specified based on device-advertised exit latencies.

In another example embodiment, the device may hide a power state entirely from the host 102 after a certain threshold has been reached. By hiding the power state of the device from the host 102, the device can extend a useful life of the device at the expense of optimal power consumption. As will be understood, the device may hide any power state that the device is programmed to enter.

The identify controller return values 104 are typically managed as a static table which is returned to the host 102 on demand. This table for the identify controller return values 104 may be drawn from values stored in the non-volatile storage 116 (typically as part of an internal management file system managed by device firmware). In aspects described, the power state modifier 114 can change these values 104, specifically the power state table. When reference is then made to the table for what power state to enter, the dynamically modified table allows the device to enter the best available power state for the device.

In differing embodiments, another threshold may be added, which marks a point at which the device is wearing out faster than rated. When the newly added threshold is reached, corrective action may be taken in the form of modifying the power state table. For example, if the device exceeded 50% of its useful life in less than 40% of the rated time or host write volume, the power state table may be modified.

Figure 3:
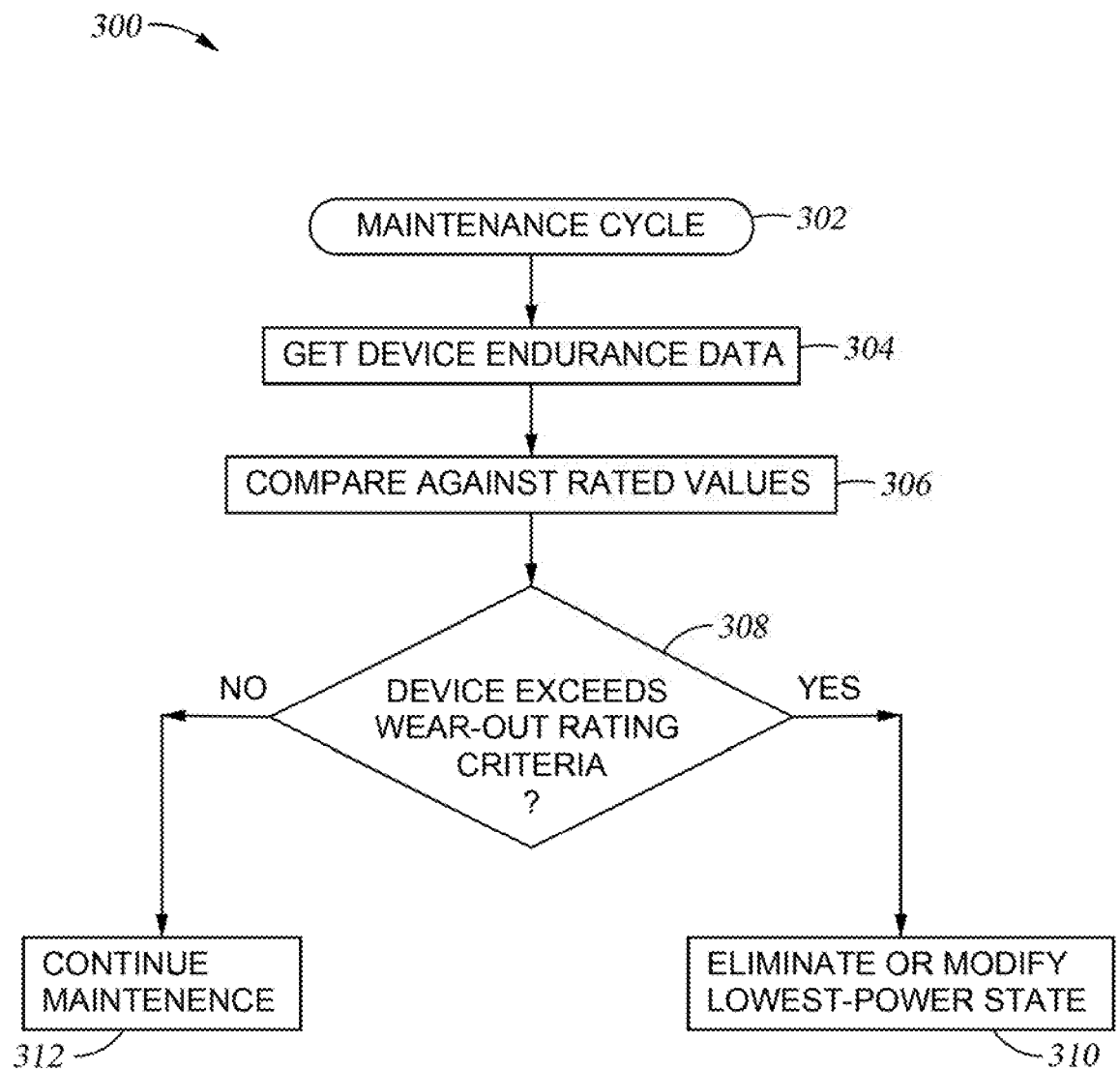
FIG. 3 is a flow chart for maintenance cycle operations in another example embodiment of the description.

Referring to FIG. 3, a flow chart for a method 300 of reviewing a maintenance cycle for a storage device is illustrated. A storage device contemplated for review may be, for example, a combination of the host interface 106, identify controller return values 104, power state modifier 114, flash translation modifier 114, power manager 108, NAND interface, storage 116, endurance counters 118 and associated controllers for the components described. At 302 a maintenance cycle may be entered by the device. Device endurance data may be obtained at 304 wherein actual values from the endurance counters 118 are obtained. At 306, the values obtained at 304 are compared to rated values for the components of the device. The rated values may be stored in the storage 116 and recovered for use at 306. At 308, a query is performed to determine if the device exceeds a wear-out rating criteria. If the device does not exceed the wear-out rating criteria, maintenance may be continued at 312. If the device does exceed the wear out rating criteria at 308, a power state may be eliminated or modified at 310 to ensure that the wear out rating is not exceeded in future iterations. As stated previously, any power state may be eliminated according to the wear out criteria.

In one embodiment, the lowest power state has the potential of increasing write amplification since when entering this power state the device is required to write all state data and close open blocks. When the device is wearing out too quickly, indicating that the host 102 triggers entry into this power state more rapidly than expected, the device may take a corrective action by eliminating the lowest power state from the advertised list of power states. The table in the identify controller return values 104 may be dynamically modified such that the lowest power state is eliminated. In other disclosed embodiments, a warning may be provided to a user that a threshold value has been exceeded. The warning may be a visual warning to the user that a number of write cycles, for example, has been exceeded by the storage device and that it is recommended to change the storage device.

In another disclosed embodiment, the device may modify a power state by increasing a rated power, and thus permit an altered action by the device. For example, devices with DDR memory to store state information consume ~15 mW while the DDR is in self-refresh mode and most of the rest of the device is powered down. Such a device may turn off DDR in order to save about 10 mW of power, but this requires writing state information to NAND. Once a media wear out threshold has been reached, the device may update a power state table to advertise that the target power is 15 mW and leave DDR operational, thus reducing write overhead.

In another embodiment of a described aspect, the device may change entry and/or exit latencies in order to influence the host power policy. By extending the latencies, a host 102 which uses these values as inputs into the amount of idle time required prior to transitioning to a specific power state may delay entry into the power state or ignore it entirely.

In another embodiment, when the device changes a power state, the host 102 is not immediately aware of the change in power state since these values are recorded in the identify controller data structure, which is not consulted after device initialization. In order to refresh the values, the device may trigger a failure state or a timeout, forcing the host 102 to reset the device and re-read the new values.

In one non-limiting embodiment, a device for storing data is disclosed comprising a storage arrangement configured to store and retrieve data, at least one endurance counter configured to monitor operations of the storage arrangement and compare operations to a threshold, a host interface configured to send and receive data from and to a host, a flash translation layer, an identify controller, a storage interface configured to send and receive data to the storage arrangement, a power state modifier configuration connected to the identify controller and a power manager configured to supply power to the storage arrangement, the host interface, the flash translation layer, the identify controller and the storage interface, wherein the identify controller is configured to have a table of power states for the storage arrangement, the host interface, the flash translation layer, the storage interface and the power state modifier is configured to update the table of power states dynamically and wherein the power manager is configured to read the table of power states and deliver power to the storage arrangement, the host interface, the flash translation layer, the identify controller and the storage interface according to the table.

In another non-limiting embodiment, the device may be configured wherein the interface to the storage arrangement is a NAND interface.

In another non-limiting embodiment, the device may further comprise at least one endurance counter configured to monitor at least one operation of the storage arrangement and compare operations to a threshold.

In another non-limiting embodiment, the device may be configured wherein the at least one operation is a write operation.

In another non-limiting embodiment, the device may be configured, wherein the at least one operation is a read operation.

In another non-limiting embodiment, the device may further comprise at least one temperature sensor measuring temperature in at least one of the storage arrangement, the power manager, the flash translation layer the storage interface and the host interface.

In another non-limiting embodiment, the device may be configured wherein the host interface is one of a PCI Express, USB, Firewire and Bluetooth interface.

In another non-limiting embodiment, a method of operation for a storage device is disclosed comprising: entering a maintenance cycle with the storage device; retrieving endurance data for at least one parameter of the storage device; comparing the endurance data for the at least one parameter of the storage device to a rated value, determining when the endurance data for the at least one parameter of the storage device exceeds the rated value and modify a lowest power state of the storage device.

In another non-limiting embodiment the method may further comprise continuing a maintenance cycle for the storage device when the endurance data for the at least one parameter of the storage device does not exceed the rated value.

In another non-limiting embodiment, the method may be performed wherein the at least one parameter of the storage device is a write cycle.

In another non-limiting embodiment, the method may be performed wherein the at least one parameter of the storage device is a read cycle.

In another non-limiting embodiment, the method may be performed wherein the at least one parameter is a temperature limitation.

In another non-limiting embodiment, the method may be performed wherein the retrieving the endurance data for the at least one parameter of the storage device is from the storage device.

In another non-limiting embodiment, the method may be performed wherein the storage device is a solid state drive.

In another non-limiting embodiment, the method may further comprise providing a warning to a user that the rated value has been exceeded.

In another non-limiting embodiment, the method may be performed wherein the warning is a visual warning.

In another non-limiting embodiment, the method may be performed wherein the lowest power state of the storage device is based on a self-idle power management scheme.

In another non-limiting embodiment, the method may be performed wherein the lowest power state of the storage device is based on a non-volatile memory power management scheme.

In another non-limiting embodiment, the method may be performed wherein the lowest power state of the storage device is based on autonomous power state transitions.

In another non-limiting embodiment, the method may be performed wherein the non-volatile memory power management scheme is a host initiated scheme.

In another non-limiting embodiment, the method may be performed wherein the autonomous power state transition is a host directed device initiated scheme.

In another non-limiting embodiment, the method may be performed wherein the self-idle power management scheme is a device initiated scheme.

In another non-limiting embodiment, the method may be performed wherein the lowest power state of the storage device is based on an active state power management.

In another non-limiting embodiment, the method may be performed wherein the lowest power state is defined by a PCIe link power state.

In another non-limiting embodiment, an arrangement is disclosed comprising means for entering a maintenance cycle with the storage device, means for retrieving endurance data for at least one parameter of the storage device, means for comparing the endurance data for the at least one parameter of the storage device to a rated value, means for determining when the endurance data for the at least one parameter of the storage device exceeds the rated value and means for modify a lowest power state of the storage device.

In another example embodiment, the arrangement may further comprise means for providing a warning to a user that the rated value has been exceeded.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A device for storing data, comprising:
   a storage arrangement configured to store and retrieve data;
   at least one endurance counter configured to monitor operations of the storage arrangement and compare operations to a threshold, wherein the operations are selected from the group consisting of a number of write operations, a number of read operations, a program frequency, an erase frequency, a bit error rate, a level of wear of a media, and a number of power on hours;
   a host interface configured to send and receive data from and to a host;
   an identify controller coupled to the host interface, the identify controller configured to store a table of power states for the storage arrangement, the host interface, the flash translation layer, the storage interface, and a power state modifier, wherein the power state modifier is connected to the identify controller;
   a flash translation layer;
   a storage interface configured to send and receive data to the storage arrangement; and
   a power manager configured to supply power to the storage arrangement, the host interface, the flash translation layer, the identify controller, and the storage interface,
   wherein the power state modifier is configured to update the table of power states dynamically based on the at least one endurance counter, and
   wherein the power manager is configured to read the updated table of power states and deliver power to the storage arrangement, the host interface, the flash translation layer, the identify controller, and the storage interface according to the updated table of power states to extend a useful life of the device.

2. The device according to claim 1, wherein the interface to the storage arrangement is a NAND interface.

3. The device according to claim 1, wherein the operations are a number of write operations and a number of read operations.

4. The device according to claim 1, wherein the operations are a program frequency and an erase frequency.

5. The device according to claim 1, further comprising:
at least one temperature sensor measuring temperature in at least one of the storage arrangement, the power manager, the flash translation layer the storage interface and the host interface.

6. The device according to claim 1, wherein the host interface is one of a PCI Express, USB, Firewire and Bluetooth interface.

7. A method of operation for a storage device, comprising:
entering a maintenance cycle with the storage device, the storage device having a plurality of power states, wherein the storage device comprises an identify controller coupled to a host interface, the identify controller configured to store a table of power states for the storage device, the host interface, a flash translation layer, a storage interface, and a power state modifier, and wherein the power state modifier is connected to the identify controller;
retrieving endurance data for at least one parameter of the storage device, wherein the endurance data is received from at least one endurance counter configured to monitor operations of the storage device, the at least one parameter being selected from the group consisting of a number of write operations, a number of read operations, a program frequency, an erase frequency, a bit error rate, a level of wear of a media, and a number of power on hours;
updating the table of power states dynamically based on the at least one endurance counter using the power state modifier;
reading the updated table of power states using the power state modifier;
delivering power to the storage device, the host interface, the flash translation layer, the identify controller, and the storage interface according to the updated table of power states to extend a useful life of the device;
comparing the endurance data for the at least one parameter of the storage device to a rated value;
determining when the endurance data for the at least one parameter of the storage device exceeds the rated value; and
eliminating a lowest power state of the storage device based on the determination to prevent the storage device from operating in the lowest power state and to extend the useful life of the device.

8. The method according to claim 7, further comprising:
continuing a maintenance cycle for the storage device when the endurance data for the at least one parameter of the storage device does not exceed the rated value.

9. The method according to claim 7, wherein the at least one parameter of the storage device is a number of write operations.

10. The method according to claim 7, wherein the at least one parameter of the storage device is a number of read operations.

11. The method according to claim 7, wherein the at least one parameter is a temperature limitation.

12. The method according to claim 7, wherein the retrieving the endurance data for the at least one parameter of the storage device is from the storage device.

13. The method according to claim 7, wherein the storage device is a solid state drive.

14. The method according to claim 7, further comprising:
providing a warning to a user that the rated value has been exceeded.

15. The method according to claim 14, wherein the warning is a visual warning.

16. The method according to claim 7, wherein the lowest power state of the storage device is based on a self-idle power management scheme.

17. The method according to claim 7, wherein the lowest power state of the storage device is based on a non-volatile memory power management scheme.

18. The method according to claim 17, wherein the non-volatile memory power management scheme is a host initiated scheme.

19. The method according to claim 7, wherein the lowest power state of the storage device is based on autonomous power state transitions.

20. The method according to claim 19, wherein the autonomous power state transition is a host directed device initiated scheme.

21. An arrangement, comprising:
means for entering a maintenance cycle with the storage device, the storage device having a plurality of power states, wherein the storage device comprises an identify controller coupled to a host interface, the identify controller configured to store a table of power states for the storage device, the host interface, a flash translation layer, a storage interface, and a power state modifier, and wherein the power state modifier is connected to the identify controller;
means for retrieving endurance data for at least one parameter of the storage device, wherein the endurance data is received from at least one endurance counter configured to monitor operations of the storage device, the at least one parameter being selected from the group consisting of a number of write operations, a number of read operations, a program frequency, an erase frequency, a bit error rate, a level of wear of a media, and a number of power on hours;
means for updating the table of power states dynamically based on the at least one endurance counter;
means for reading the updated table of power states;
means for delivering power to the storage device, the host interface, the flash translation layer, the identify controller, and the storage interface according to the updated table of power states to extend a useful life of the device;
means for comparing the endurance data for the at least one parameter of the storage device to a rated value;
means for determining when the endurance data for the at least one parameter of the storage device exceeds the rated value; and
means for eliminating a lowest power state of the storage device based on the determination to prevent the storage device from operating in the lowest power state and to extend the useful life of the device.

22. The arrangement according to claim 21, further comprising:
means for providing a warning to a user that the rated value has been exceeded.

* * * * *